United States Patent
Park

(10) Patent No.: US 10,138,929 B2
(45) Date of Patent: Nov. 27, 2018

(54) ASSEMBLY STRUCTURE OF ROLLER

(71) Applicant: Eun Soo Park, Yongin-si (KR)

(72) Inventor: Eun Soo Park, Yongin-si (KR)

( * ) Notice: Subject to any disclaimer, the term of this patent is extended or adjusted under 35 U.S.C. 154(b) by 166 days.

(21) Appl. No.: 15/289,716

(22) Filed: Oct. 10, 2016

(65) Prior Publication Data

US 2017/0204899 A1   Jul. 20, 2017

(30) Foreign Application Priority Data

Jan. 14, 2016  (KR) .................. 10-2016-0004536

(51) Int. Cl.
- B21B 27/03   (2006.01)
- F16C 13/00   (2006.01)
- B21B 31/07   (2006.01)

(52) U.S. Cl.
CPC ............ F16C 13/00 (2013.01); B21B 27/035 (2013.01); B21B 31/07 (2013.01); F16C 2322/12 (2013.01)

(58) Field of Classification Search
CPC .................................. F16C 3/18; B21B 27/02
USPC ...................................... 492/40, 47
See application file for complete search history.

(56) References Cited

U.S. PATENT DOCUMENTS

| | | | | |
|---|---|---|---|---|
| 4,748,729 A | * | 6/1988 | Rochelmeyer | B21B 27/035 492/40 |
| 4,841,612 A | * | 6/1989 | Kark | B21B 27/035 492/1 |
| 4,966,026 A | * | 10/1990 | Nishino | B21B 1/0886 72/224 |
| 5,040,398 A | * | 8/1991 | Nakagawa | B21B 27/03 492/3 |
| 5,483,812 A | * | 1/1996 | Dempsey | B21B 27/035 492/1 |
| 5,558,610 A | * | 9/1996 | Byung-Gie | F16D 1/097 492/40 |
| 5,735,788 A | * | 4/1998 | Yasutake | B21B 27/035 492/39 |
| 7,572,215 B2 | * | 8/2009 | Kayhan | B21B 27/035 492/39 |
| 7,582,046 B2 | * | 9/2009 | Kayhan | B21B 27/035 492/1 |

(Continued)

FOREIGN PATENT DOCUMENTS

| JP | 08-141608 A | 6/1996 |
|---|---|---|
| JP | 2001-150309 A | 6/2001 |

(Continued)

*Primary Examiner* — Jason L Vaughan
(74) *Attorney, Agent, or Firm* — John K. Park; Park Law Firm

(57) ABSTRACT

An assembly structure of a roller which includes a shaft, a ring unit, and a fixing unit. When the shaft and the ring unit are combined, the center of the bearing unit of the shaft and the center of the outer circumferential surface of the ring unit coincide, the center of the ring mounting unit of the shaft and the center of the inner circumferential surface of the ring unit coincide, the center of the bearing unit of the shaft and the center of the ring mounting unit are spaced apart, the diameter of the bearing unit is shorter than the diameter of the ring mounting unit, and a distance between the centers of the bearing unit of the shaft and the ring mounting unit is equal to or shorter than the distance between the diameter of the ring mounting unit and the diameter of the bearing unit.

3 Claims, 8 Drawing Sheets

(56) References Cited

U.S. PATENT DOCUMENTS 8,133,162 B2 * 3/2012 Gleizer ................ B21B 27/035
492/39
8,915,830 B2 * 12/2014 March .................... B65G 39/07
29/895.21

FOREIGN PATENT DOCUMENTS

| JP | 4278816 B2 | 6/2009 |
| JP | 2015-205292 A | 11/2015 |
| KR | 10-0782751 B1 | 12/2007 |
| KR | 10-2012-0070208 A | 6/2012 |
| KR | 10-1242980 B | 3/2013 |

\* cited by examiner

ASSEMBLY STRUCTURE OF ROLLER

BACKGROUND OF THE INVENTION

Field of the Invention

The present invention relates to an assembly structure of a roller, and more particularly, to an assembly structure of a roller in which a ring fit on a shaft does not cause slip relative to the shaft.

Background Art

Rollers are cylindrical bodies which are used to compress and transform things or to help movement of things. For instance, there are rolling rollers as representative rollers for compressing and transforming things.

The conventional rolling roller includes a shaft manufactured integrally to receive rotary power. However, such a conventional rolling roller has several disadvantages in that it causes lots of economic losses and it is difficult to work due to its heavy weight because the rolling roller must be replaced or repaired integrally when the surface of the roller is damaged during rolling work.

In order to solve the problems, Korean Patent Laid-open No. 10-2012-0070208 discloses a rolling roller 1, in which a part to compress a workpiece is disposed to be separated by a ring unit 20 formed in a hollow cylindrical shape and is forcedly fit to a shaft 10 so that only the ring unit 20 can be separately replaced and repaired. (See FIG. 1)

The 'ring unit' of the rolling roller 1 is called a 'rolling ring', and in the present invention, the 'ring unit' will be also called the 'rolling ring'.

Such a rolling roller 1 includes a clamp 40 for pressing the rolling ring 20, which is fit to the shaft, toward a collar unit 30 or a spacer 50. Finally, rotary power of the shaft 10 is transferred to the rolling ring 20 when the clamp 40 fixed to the shaft 10 comes into contact with a side portion of the rolling ring 20 to press the side portion of the rolling ring 20. However, frictional force between the rolling ring 20 and the workpiece causes a slip between the rolling ring 20 and the shaft 10, such that the surface of the workpiece becomes bad and the rolling roller is damaged.

In order to solve the above-mentioned problem, as shown in FIG. 2, Korean Patent No. 10-0782751 discloses a structure that a collar unit 30 of a shaft 10 is processed to be inclined so as to interlock with an inclined side of a rolling ring 20. Additionally, Korean Patent No. 10-0782751 discloses a structure that a spacer located at the center has inclined surfaces disposed at both sides thereof in case that a rolling ring is divided into two.

However, such prior arts have several disadvantages in that it is complicated to form the inclined surfaces at the side of the rolling ring 20 and in that a mounting area of a caliber for rolling workpieces, such as wires or rods, inside a rolling mill 100 having a predetermined width as shown in FIG. 3 is reduced and productivity is deteriorated because the clamp 40 is mounted on the shaft 10 in a protrusion manner while getting in contact with the side of the rolling ring 20.

CITED REFERENCES

Patent Documents

Patent Reference 0001: Korean Patent Laid-open No. 10-2012-0070208 A published on Jun. 29, 2012, Representative FIG. 1

Patent Reference 0002: Korean Patent No. 10-0782751 B granted on Dec. 5, 2007, Representative FIG. 5

Patent Reference 0003: Korean Patent No. 10-1242980 B granted on Mar. 12, 2013, Representative FIGS. 7 and 8

SUMMARY OF THE INVENTION

Accordingly, the present invention has been made in view of the above-mentioned problems occurring in the prior art, and it is an object of the present invention to provide an assembly structure of a roller which prevents a slip between a ring unit fit to a shaft and the shaft.

It is another object of the present invention to provide an assembly structure of a roller in which a plurality of calibers are arranged on the surface of the ring unit, thereby enhancing production efficiency.

To accomplish the above objects, according to the present invention, there is provided an assembly structure of a roller including: a shaft having a ring mounting unit and bearing units connected to both end portions of the ring mounting unit; a ring unit fit onto the shaft in the form that its inner circumferential surface comes into contact with the outer circumferential surface of the ring mounting unit; and a fixing unit for restraining separation of the ring unit from the ring mounting unit, wherein when the shaft and the ring unit are combined with each other, the center of the bearing unit of the shaft and the center of the outer circumferential surface of the ring unit coincide with each other, the center of the ring mounting unit of the shaft and the center of the inner circumferential surface of the ring unit coincide with each other, the center of the bearing unit of the shaft and the center of the ring mounting unit are spaced apart from each other, the diameter of the bearing unit is shorter than the diameter of the ring mounting unit, and a distance between the center of the bearing unit of the shaft and the center of the ring mounting unit is equal to or shorter than the distance between the diameter of the ring mounting unit and the diameter of the bearing unit.

Moreover, the fixing unit is arranged inside the ring unit and is also arranged not to protrude to the side of the ring unit.

Furthermore, the fixing unit includes: a collar unit formed in such a way that the rim of one side of the outer circumferential surface of the ring mounting unit protrudes outwardly; a clamp mounting screw unit formed on the rim of the other side of the ring mounting unit; a collar unit insertion part formed in the ring unit to receive the collar unit; a clamp; and a clamp insertion part formed in the ring unit to receive the clamp coupled to the clamp mounting screw unit.

The assembly structure of the roller according to the present invention can prevent slip between the shaft and the ring unit, namely, rolling ring, fit to the shaft even though it does not have a key hole and a key and the ring unit is not suppressed by the clamp, and can enhance production efficiency because lots of the calibers are arranged on the surface of the ring unit.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, reference will be now made in detail to preferred embodiment of the present invention with reference to the attached drawings.

In the preferred embodiment of the present invention, a rolling roller is exemplified, but of course, the technical idea of the present invention can be applied to any rollers having the structure that a ring unit is forcedly fit and assembled to a shaft.

Figure 4:
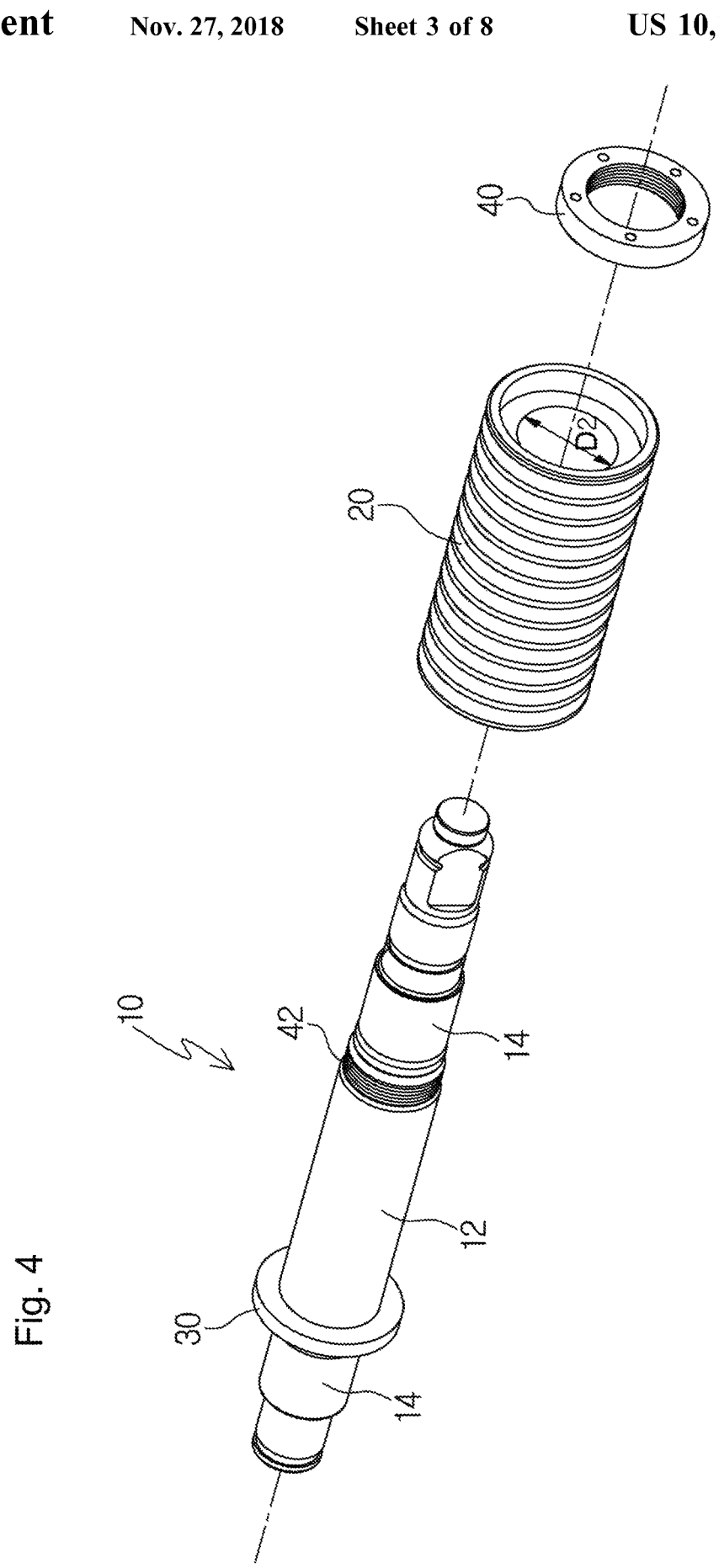
FIG. 4 is an exploded perspective view of a rolling roller according to a preferred embodiment of the present invention.
Figure 5:
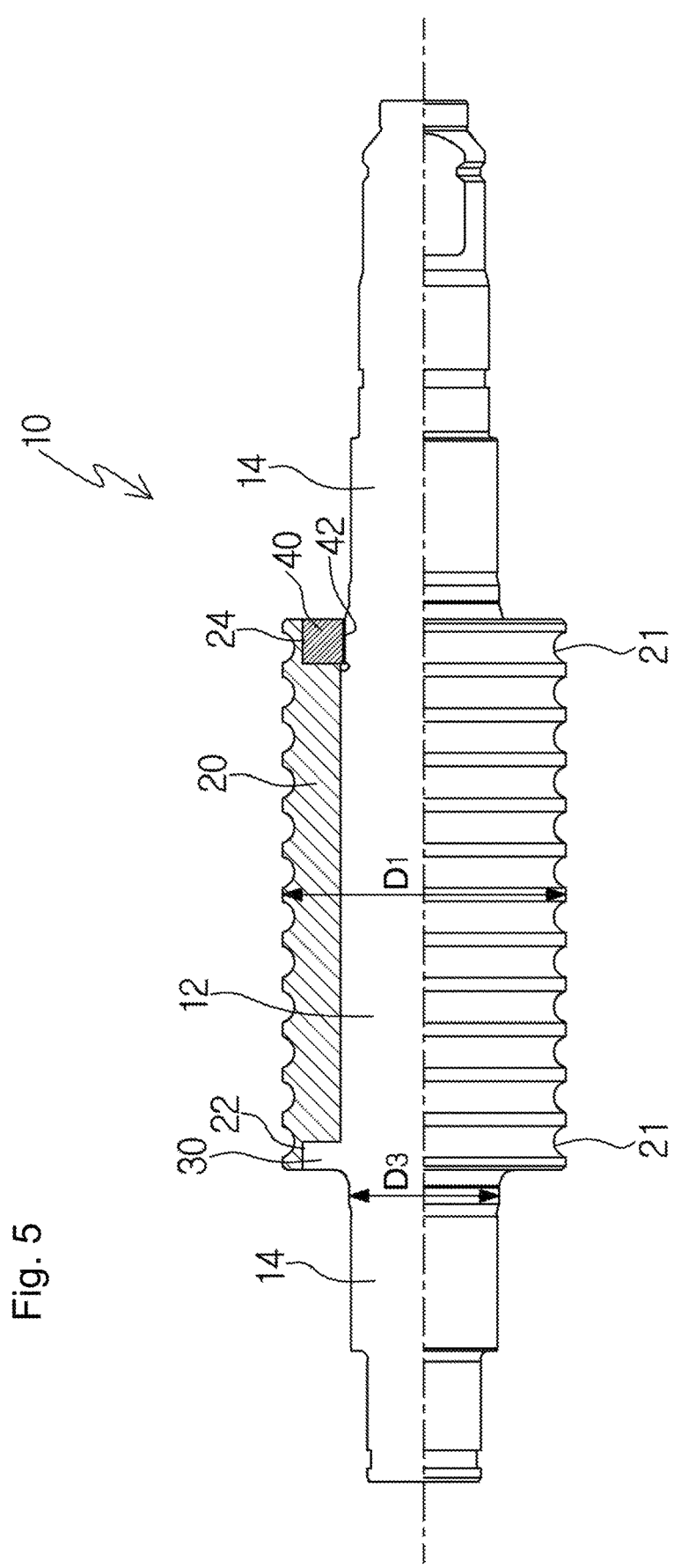
FIG. 5 is a sectional view of the rolling roller according to the preferred embodiment of the present invention.

FIG. 4 is an exploded perspective view of a rolling roller according to a preferred embodiment of the present invention, and FIG. 5 is a sectional view of the rolling roller according to the preferred embodiment of the present invention.

A shaft 10 has a ring mounting unit 12 to which a rolling ring 20 is forcedly fit and bearing units 14 disposed at both sides of the ring mounting unit 12. A collar unit 30 is formed in such a way that the rim of one side of the ring mounting unit 12 protrudes outwardly so as to serve as a stopper when the rolling ring 20 is fit to the shaft 10, and a clamp mounting screw unit 42 is formed at the rim of the other side of the ring mounting unit 12 so as to mount a clamp 40.

The rolling ring 20 includes: a collar unit insertion part 22 for receiving the collar unit 30; and a clamp insertion part 24 to which the clamp 40 coupled with the clamp mounting screw unit 42. The collar unit insertion part 22 and the clamp insertion part 24 are respectively formed at corresponding positions of the collar unit 30 of the shaft 10 and the clamp mounting screw unit 42.

In this embodiment, an outer diameter D1 of the rolling ring 20 is 400 mm, and an inner diameter D2 is 220 mm. The bearing unit 14 of the shaft 10 has various diameters in order to support the shaft and transfer driving power, and a 'diameter of the bearing unit' means the largest diameter of the bearing unit except the rim connected with the ring mounting unit 12. In this embodiment, a diameter D3 of the bearing unit is 192 mm.

When the rolling ring 20 is fit to the shaft 10, a hollow part of the rolling ring 20 is forcedly fit with the ring mounting unit 12 after passing through the bearing unit 14 of the shaft 10, and then, is inserted till the collar unit 30 and the is coupled with the collar unit insertion part 24. After that, the clamp 40 is assembled to the clamp mounting screw unit 42, and then, the clamp 40 is manipulated to fix the rolling ring 20 to the shaft 10. Therefore, after the rolling ring 20 is forcedly fit to the ring mounting unit 12, the rolling ring 20 is suppressed in axial movement by a fixing unit formed by the collar unit 30 and the clamp 40.

Figure 1:
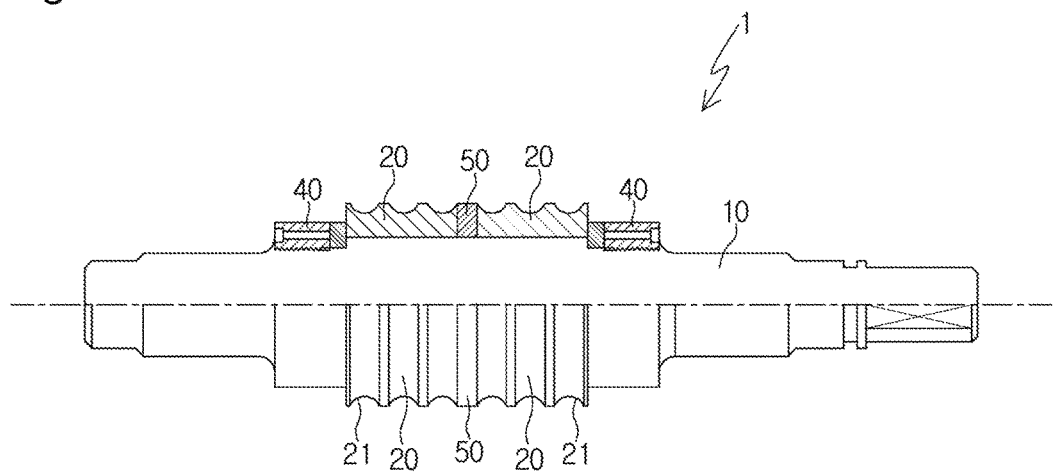
FIGS. 1 and 2 are views showing a structure of a conventional rolling roller.
Figure 2:
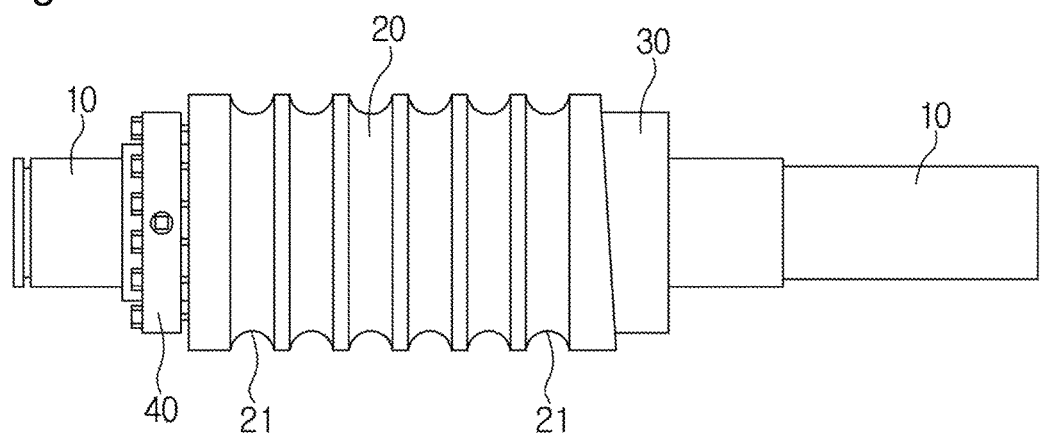
Figure 3:
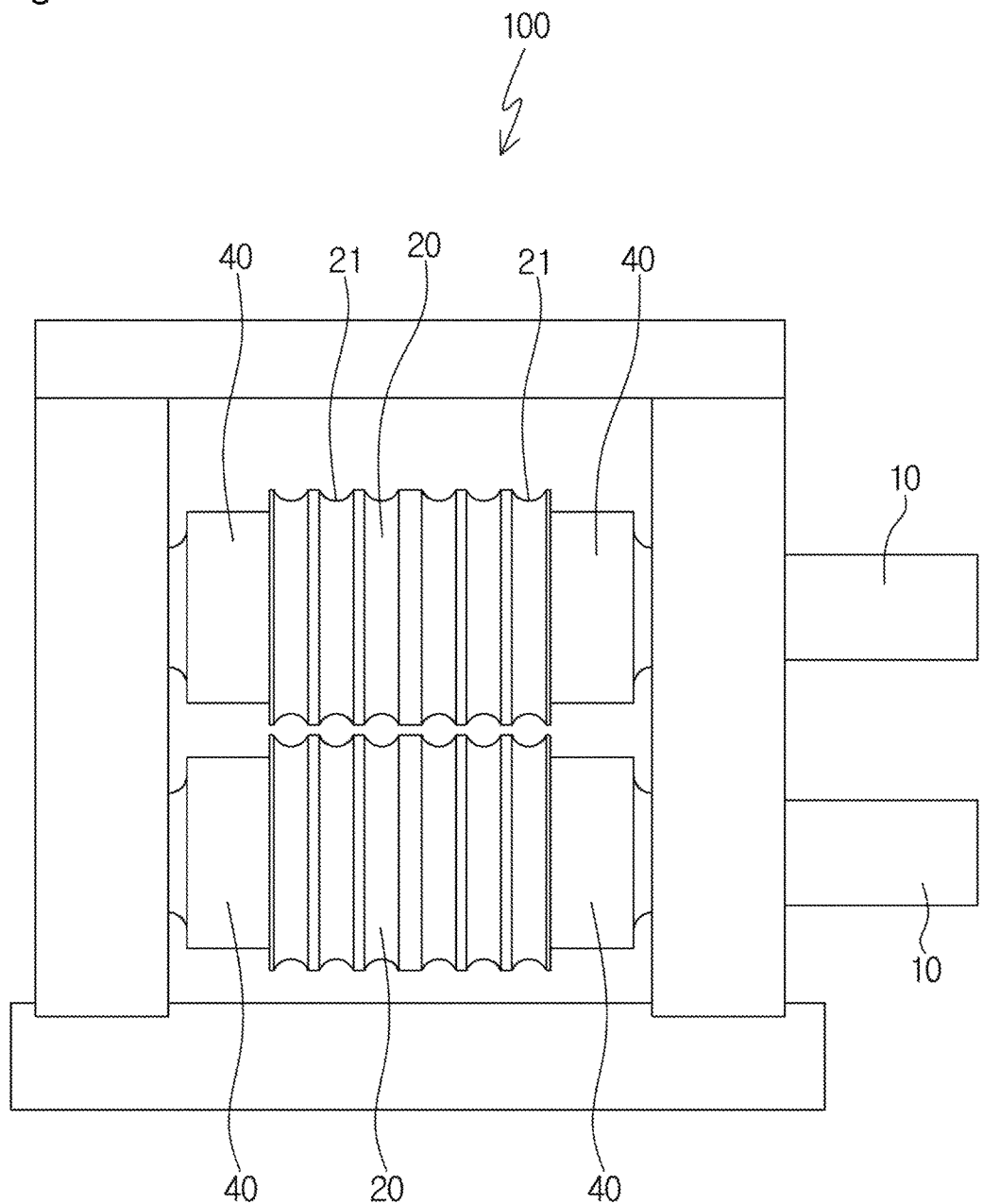
FIG. 3 is a view showing a structure of a rolling mill.
Figure 6:
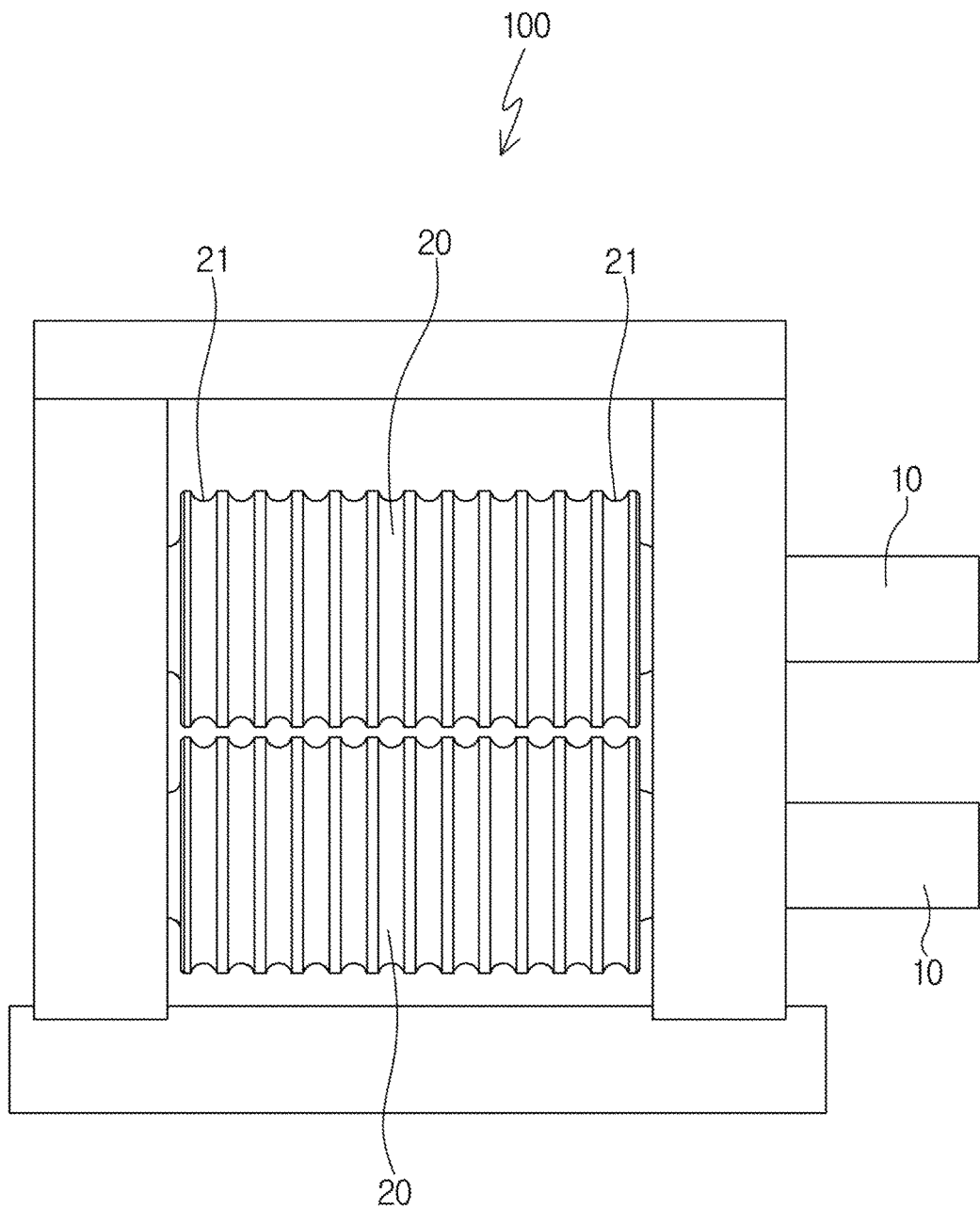
FIG. 6 is a view showing a rolling mill to which the rolling roller according to the preferred embodiment of the present invention is applied.

The clamp 40 may be a hydraulic clamp on the market. Conventionally, because rotary power of the shaft is transferred by frictional force between the clamp 40 and the collar unit or the spacer getting in contact with the side of the rolling ring 20 using the clamp 40 pressurizes the rolling ring 20 toward the collar unit or the spacer, namely, in the axial direction, a clamp having axially great pressure is needed, but such a clamp cannot to adhered to the side of the rolling ring 20 as shown in FIG. 1 as being bulky. However, in the present invention, the principal source for transferring rotary power of the shaft to the rolling ring is not the axial pressure of the clamp. The assembly structure of the roller according to the present invention ca sufficiently transfer rotary power of the shaft to the rolling ring just by preventing the rolling ring inserted into the ring mounting unit from moving in the axial direction. Accordingly, there is no need to make the clamp big-sized. Therefore, the clamp 40 can be arranged inside the rolling ring 20. Furthermore, the collar unit 30 can be compact-sized because there is no need for the collar unit 30 to endure an axial load and can be arranged inside the rolling ring 20. Therefore, as shown in FIG. 6, in the rolling mill 100 illustrated in FIG. 6, a roller having the wider rolling ring 20 can be arranged in a space of a predetermined width in which the rolling roller is arranged. Compared with the rolling mill 100 having the conventional rolling roller 20 shown in FIG. 3, because an available width of the rolling ring 20 gets larger to the width of the clamp 40, more calibers 21 can be arranged so as to enhance production efficiency.

In the present embodiment, it is described that the fixing unit is formed in such a way that the clamp 40 is arranged on the rim of one side of the ring mounting unit 12 and the collar unit 30 is formed on the rim of the other side, but it is natural that the fixing unit can be formed in such a way that the clamps are respectively arranged on the rims of both sides of the ring mounting unit without the collar unit.

The shaft 10 and the rolling ring 20 respectively have two spindles.

First, the center C1 of the bearing unit 14 of the shaft 10 coincides with the center C1 of the outer circumferential surface of the ring unit 20, and the center C2 of the ring mounting unit 12 of the shaft 10 coincides with the center C2 of the inner circumferential surface of the ring unit 20.

The center C1 of the bearing unit of the shaft (and the center of the outer circumferential surface of the ring unit) is spaced apart from the center C2 of the ring mounting unit of the shaft (and the center of the inner circumferential surface of the ring unit). In the present invention, a distance between the center C1 and the center C2 is about 2.5 mm. Because it is difficult to distinguish the distance in the drawings, in FIGS. 7 to 9, the sizes of the shaft and the rolling ring and the distance between the shaft and the rolling ring will be conceptually and exaggeratingly illustrated within the technical idea and scope of the present invention, and the fixing unit is not illustrated.

Figure 7:
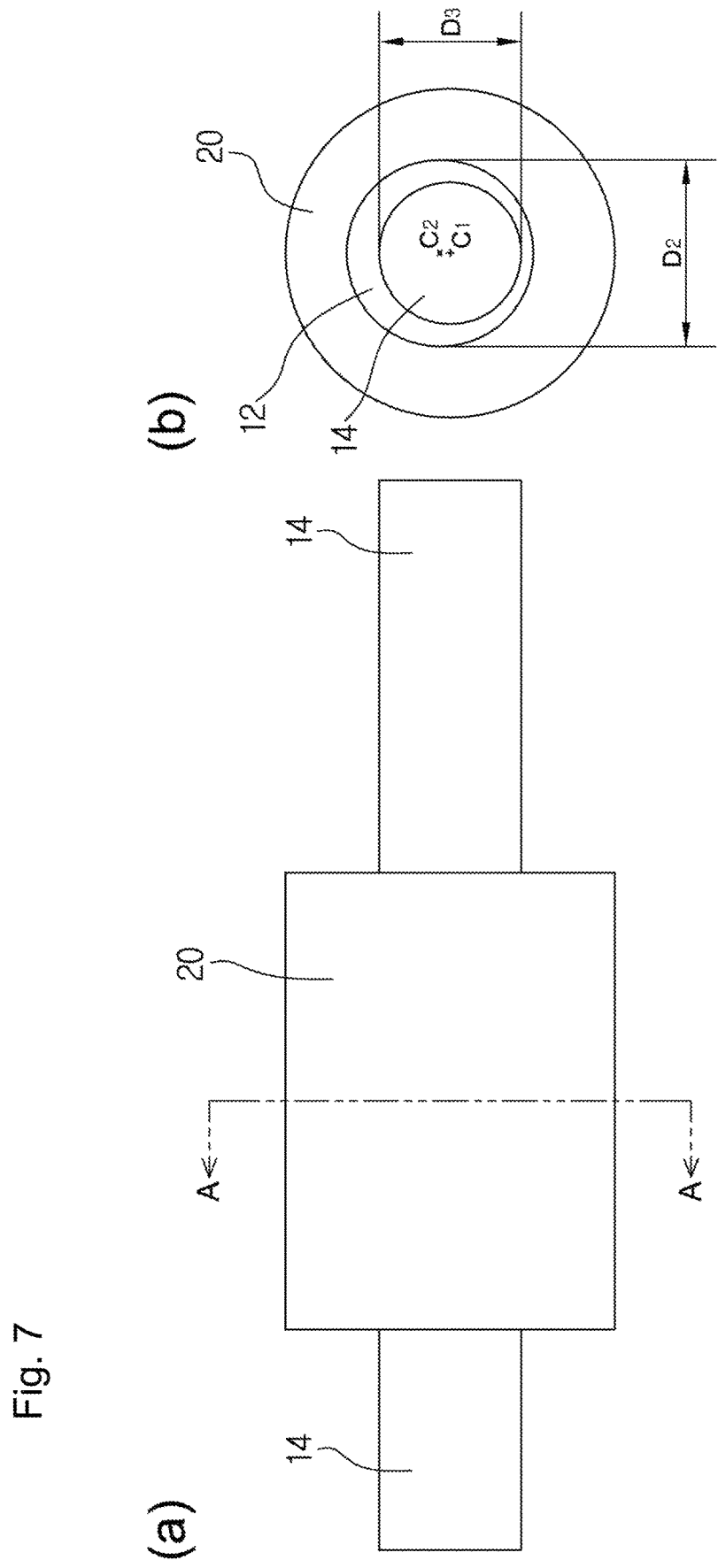
FIGS. 7 to 9 are schematic diagrams for explaining working relationship of the rolling roller according to the preferred embodiment of the present invention.

As shown in FIG. 7, in order to insert the rolling ring 20 into the ring mounting unit 12, a diameter D3 of the bearing unit 14 must be smaller than a diameter D2 of the ring mounting unit 12, and the distance between the center C1 of the bearing unit 14 of the shaft and the center C2 of the ring mounting unit 12 must be equal to or smaller than a difference between the diameter D2 of the ring mounting unit 12 and the diameter D3 of the bearing unit 14.

Figure 8:
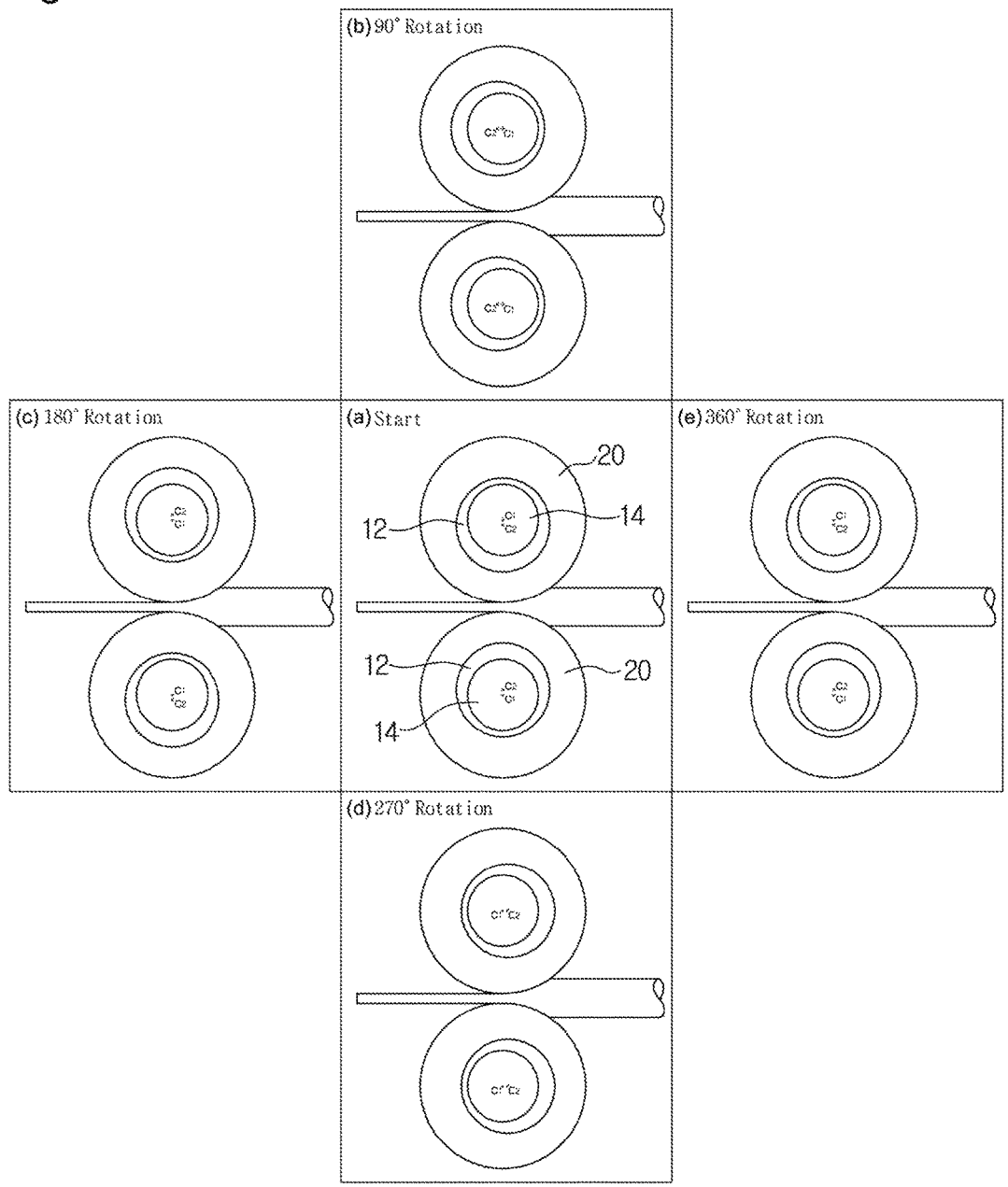

FIG. 8 illustrates a process that the rolling roller of FIG. 7 is rotated. Because the center of the bearing unit 14 of the shaft 10 coincides with the center C1 of the outer circumferential surface of the rolling ring 20, a distance between an upper roller and a lower roller is not changed during the entire rolling process.

Figure 9:
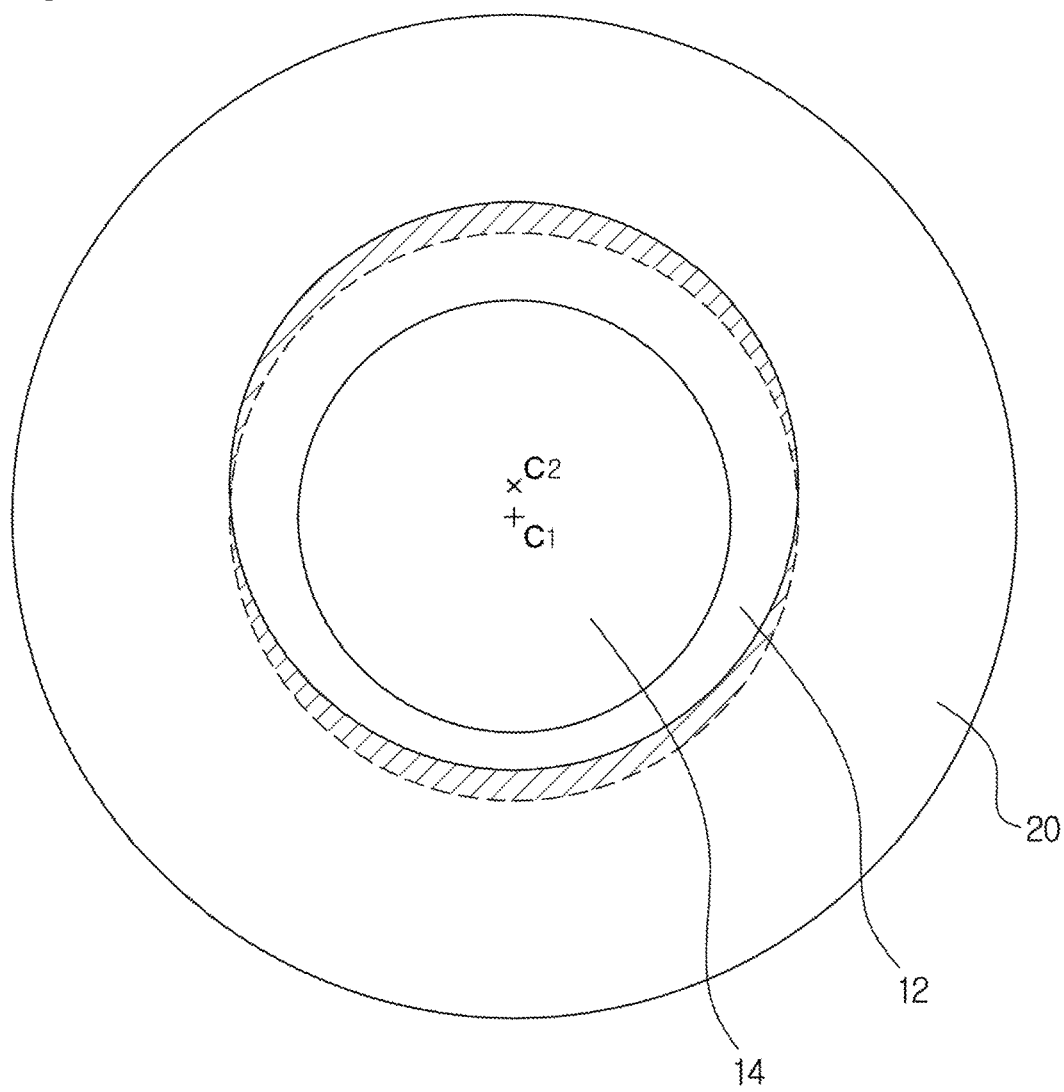

As described above, while the roller rotates, a deviant crease line area of FIG. 9, which is formed by off-center between the center C1 of the ring mounting unit 12 and the center of the inner circumferential surface of the rolling ring 20, serves as a key and a key hole, so that a slip is not caused between the shaft 10 and the rolling ring 20 during rotation. Moreover, because a boundary between the ring mounting unit 12 and the inner circumferential surfaces of the ring mounting part is formed in a circle, differently from the conventional rectangular groove type key hole formed in the shaft and the ring unit (rolling ring), because the deviant crease line area of FIG. 9 does not cause stress concentration and fatigue of the shaft, the assembly structure of the roller according to the present invention provide excellent durability and is not broken down.

What is claimed is:

1. An assembly structure of a roller which includes: a shaft having a ring mounting unit and bearing units connected to both end portions of the ring mounting unit; a ring unit fit onto the shaft in the form that an inner circumferential surface of the ring unit comes into contact with the outer circumferential surface of the ring mounting unit; and a fixing unit for restraining separation of the ring unit from the ring mounting unit,
   wherein when the shaft and the ring unit are combined with each other, the center of the bearing units of the shaft and the center of the outer circumferential surface of the ring unit coincide with each other,
   the center of the ring mounting unit of the shaft and the center of the inner circumferential surface of the ring unit coincide with each other,
   the center of the bearing units of the shaft and the center of the ring mounting unit are spaced apart from each other,
   the diameter of the bearing units is smaller than the diameter of the ring mounting unit, and
   a distance between the center of the bearing units of the shaft and the center of the ring mounting unit is equal to or smaller than the distance between the diameter of the ring mounting unit and the diameter of the bearing units,
   wherein the fixing unit is arranged inside the ring unit and is also arranged not to protrude to the side of the ring unit.

2. The assembly structure of the roller according to claim 1, wherein the fixing unit comprises:
   a collar unit formed in such a way that a rim of one side of the outer circumferential surface of the ring mounting unit protrudes outwardly;
   a clamp mounting screw unit formed on a rim of the other side of the ring mounting unit;
   a collar unit insertion part formed in the ring unit to receive the collar unit;
   a clamp; and
   a clamp insertion part formed in the ring unit to receive the clamp coupled to the clamp mounting screw unit.

3. An assembly structure of a roller which includes: a shaft having a ring mounting unit and bearing units connected to both end portions of the ring mounting unit; a ring unit fit onto the shaft in the form that an inner circumferential surface of the ring unit comes into contact with the outer circumferential surface of the ring mounting unit; and a fixing unit for restraining separation of the ring unit from the ring mounting unit,
   wherein when the shaft and the ring unit are combined with each other, the center of the bearing units of the shaft and the center of the outer circumferential surface of the ring unit coincide with each other,
   the center of the ring mounting unit of the shaft and the center of the inner circumferential surface of the ring unit coincide with each other,
   the center of the bearing units of the shaft and the center of the ring mounting unit are spaced apart from each other,
   the diameter of the bearing units is smaller than the diameter of the ring mounting unit, and
   a distance between the center of the bearing units of the shaft and the center of the ring mounting unit is equal to or smaller than the distance between the diameter of the ring mounting unit and the diameter of the bearing units,
   wherein the fixing unit comprises:
   a collar unit formed in such a way that a rim of one side of the outer circumferential surface of the ring mounting unit protrudes outwardly;
   a clamp mounting screw unit formed on a rim of the other side of the ring mounting unit;
   a collar unit insertion part formed in the ring unit to receive the collar unit;
   a clamp; and
   a clamp insertion part formed in the ring unit to receive the clamp coupled to the clamp mounting screw unit.

* * * * *